United States Patent
Garner et al.

(10) Patent No.: US 10,076,153 B2
(45) Date of Patent: Sep. 18, 2018

(54) THERMAL PROTECTION SYSTEM AND RELATED COMPOSITIONS OF MATTER

(71) Applicant: KASSEL LLC, Bridgewater, NJ (US)

(72) Inventors: Dena Garner, Isle of Palms, SC (US); Henry D. Cross, III, Murrells Inlet, SC (US)

(73) Assignee: Kassel LLC, Bridgewater ( * ) Notice: Subject to any disclaimer, the term of this patent is extended or adjusted under 35 U.S.C. 154(b) by 151 days.

(21) Appl. No.: 15/230,900

(22) Filed: Aug. 8, 2016

(65) Prior Publication Data

US 2017/0042282 A1 Feb. 16, 2017

Related U.S. Application Data

(60) Provisional application No. 62/203,069, filed on Aug. 10, 2015.

(51) Int. Cl.
*A43B 7/34* (2006.01)
*A43B 17/00* (2006.01)
(Continued)

(52) U.S. Cl.
CPC .............. *A43B 7/34* (2013.01); *A43B 17/006* (2013.01); *A43B 17/026* (2013.01); *B32B 3/26* (2013.01);
(Continued)

(58) Field of Classification Search
CPC ..................................................... A43B 17/00
(Continued)

(56) References Cited

U.S. PATENT DOCUMENTS

| 1,479,883 | A | 1/1924 | Wheeler |
| 1,847,523 | A | 3/1932 | Daly |

(Continued)

FOREIGN PATENT DOCUMENTS

GB 2137866 A 10/1984

OTHER PUBLICATIONS

The inserts turn your shoes into portable radiators for cold weather applications, Popular Mechanics, Apr. 2004, p. 84 (Year: 2004).*

Primary Examiner — Brent T O'Hern
(74) Attorney, Agent, or Firm — Weitzman Law Offices, LLC; Kenneth Weitzman; Daniel Douglas (57) ABSTRACT

A thermal protection system is disclosed herein. In various aspects, the thermal protection system includes an insert. The insert may include a first layer and a second layer bonded to one another. The insert may be removeably receivable within a cavity of a shoe to form a thermally insulating barrier between a plantar surface of a user's foot and a sole of the shoe with a side of the first layer oriented toward the sole and a side of the second layer oriented toward the plantar surface. The first layer may include an aerogel and the second layer may include a meta aramid polymer, in various aspects. Related compositions of matter disclosed herein, in various aspects, include a plurality of layers bonded to one another in the form of an insert removeably receivable within a cavity of a shoe to create a thermal barrier between a sole of the shoe and a plantar surface of a foot of a user. This Abstract is presented to meet requirements of 37 C.F.R. § 1.72(b) only, and is not intended to identify key elements of the apparatus, methods, and compositions of matter disclosed herein or to delineate the scope thereof.

20 Claims, 5 Drawing Sheets

(51) Int. Cl.
  *A43B 17/02*  (2006.01)
  *B32B 3/26*  (2006.01)
  *B32B 27/06*  (2006.01)
  *B32B 27/34*  (2006.01)
  *B32B 27/32*  (2006.01)
  *B32B 17/06*  (2006.01)

(52) U.S. Cl.
  CPC ............ *B32B 17/064* (2013.01); *B32B 27/06* (2013.01); *B32B 27/32* (2013.01); *B32B 27/34* (2013.01); *B32B 2305/02* (2013.01); *B32B 2307/306* (2013.01); *B32B 2437/02* (2013.01)

(58) Field of Classification Search
  USPC .......................................................... 428/68
  See application file for complete search history.

(56) References Cited

U.S. PATENT DOCUMENTS

| | | | |
|---|---|---|---|
| 2,284,947 A | 6/1942 | Clifford | |
| 2,561,891 A | 7/1951 | Tucker | |
| 2,641,068 A | 6/1953 | Thompson | |
| 2,736,109 A | 2/1956 | Scholl | |
| 3,235,981 A | 2/1966 | Kloss | |
| 4,658,515 A | 4/1987 | Oatman | |
| 4,729,179 A | 3/1988 | Quist, Jr. | |
| 4,813,160 A | 3/1989 | Kuznetz | |
| 4,991,317 A | 2/1991 | Lakic | |
| 5,025,575 A | 6/1991 | Lakic | |
| 5,220,791 A | 6/1993 | Bulzomi | |
| 5,499,460 A | 3/1996 | Bryant et al. | |
| 5,584,130 A | 12/1996 | Perron | |
| 6,967,044 B1 | 11/2005 | O'brien | |
| 7,165,344 B2 | 1/2007 | Blackwell | |
| 7,441,351 B2 | 10/2008 | Clark et al. | |
| 7,730,640 B2 | 6/2010 | Clark et al. | |
| 8,176,659 B2 | 5/2012 | Von Blücher | |
| 8,402,676 B2 | 3/2013 | Von Blücher | |
| 8,561,237 B2 | 10/2013 | Stratten et al. | |
| 8,661,716 B2 | 3/2014 | Stead | |
| 2005/0044751 A1 | 3/2005 | Alaimo et al. | |
| 2006/0090376 A1 | 5/2006 | Perotto et al. | |
| 2007/0204482 A1 | 9/2007 | Gibson-collinson | |
| 2007/0234592 A1 | 10/2007 | Crates | |
| 2009/0288313 A1* | 11/2009 | Rapaport | B29C 66/83221 36/29 |
| 2011/0107621 A1 | 5/2011 | Mordecai et al. | |
| 2011/0225847 A1 | 9/2011 | Buchanan | |
| 2012/0192452 A1 | 8/2012 | Lewis et al. | |
| 2012/0266492 A1 | 10/2012 | Youngs et al. | |
| 2014/0007461 A1 | 1/2014 | Carbo, Jr. et al. | |

* cited by examiner

THERMAL PROTECTION SYSTEM AND RELATED COMPOSITIONS OF MATTER

CROSS-REFERENCE TO RELATED APPLICATIONS

The present application claims priority and benefit of U.S. Provisional Patent Application No. 62/203,069 filed 10 Aug. 2015, which is hereby incorporated by reference in its entirety herein.

BACKGROUND OF THE INVENTION

Field

This disclosure relates to footwear and, more particularly, to inserts for thermal protection of the user's feet.

Background

Various athletic activities may be engaged in on artificial surfaces in outdoor settings. Soccer, American football, baseball, track and field events, tennis, lacrosse, and rugby are but a few examples of these various athletic activities. As used herein, artificial surfaces may include asphalt, clay, polyurethane, and concrete surfaces. Artificial surfaces may further include artificial turf such as, for example, Astro-Turf®, OmniTurf®, and FieldTurf®.

Such artificial surfaces, as well as natural surfaces, may become heated, for example, due to solar radiation. In any event, the temperature of the artificial surface may cause discomfort to the feet of the participants that may interfere with the conduct of the athletic activity. For example, per a professional soccer player, an artificial surface may reach a temperature sufficient to burn or blisters the feet. Such burns or blisters may be severe enough that participants may be forced to leave the game.

Accordingly, there is a need for improved apparatus as well as related methods and compositions of matter for the protection of the feet of athletes from heated artificial surfaces.

BRIEF SUMMARY OF THE INVENTION

These and other needs and disadvantages may be overcome by the apparatus and related methods of use and compositions of matter disclosed herein. Additional improvements and advantages may be recognized by those of ordinary skill in the art upon study of the present disclosure.

A thermal protection system is disclosed herein. In various aspects, the thermal protection system includes an insert. The insert may include a first layer and a second layer bonded to one another. The insert may be removably receivable within a cavity of a shoe to form a thermally insulating barrier between a plantar surface of a user's foot and a sole of the shoe with a side of the first layer oriented toward the sole and a side of the second layer oriented toward the plantar surface. The first layer may include an aerogel and the second layer may include a meta aramid polymer, in various aspects.

Related compositions of matter disclosed herein, in various aspects, include a plurality of layers bonded to one another in the form of an insert removably receivable within a cavity of a shoe to create a thermal barrier between a sole of the shoe and a plantar surface of a foot of a user.

This summary is presented to provide a basic understanding of some aspects of the apparatus and methods disclosed herein as a prelude to the detailed description that follows below. Accordingly, this summary is not intended to identify key elements of the apparatus, methods, and compositions of matter disclosed herein or to delineate the scope thereof.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure. Note that the inserts tested in Experiments 1, 2, and 3 are exemplary. Neither the inserts tested in Experiments 1, 2, and 3 nor the conditions of Experiments 1, 2, and 3 should be considered limiting unless expressly so stated.

DETAILED DESCRIPTION OF THE INVENTION

A thermal protection system that thermally protects the user's foot is disclosed herein. In various aspects, the thermal protection system comprises an insert that is removably receivable within a cavity of a shoe. The insert includes multiple layers of material bonded together, with the multiple layers of material conferring various mechanical or thermal properties upon the insert, in various aspects. The insert may protect a foot of a user by insulating the foot against the heat of a surface upon which the shoe is worn. Related methods of use and compositions of matter are also disclosed herein.

Figures 1A, 1B:
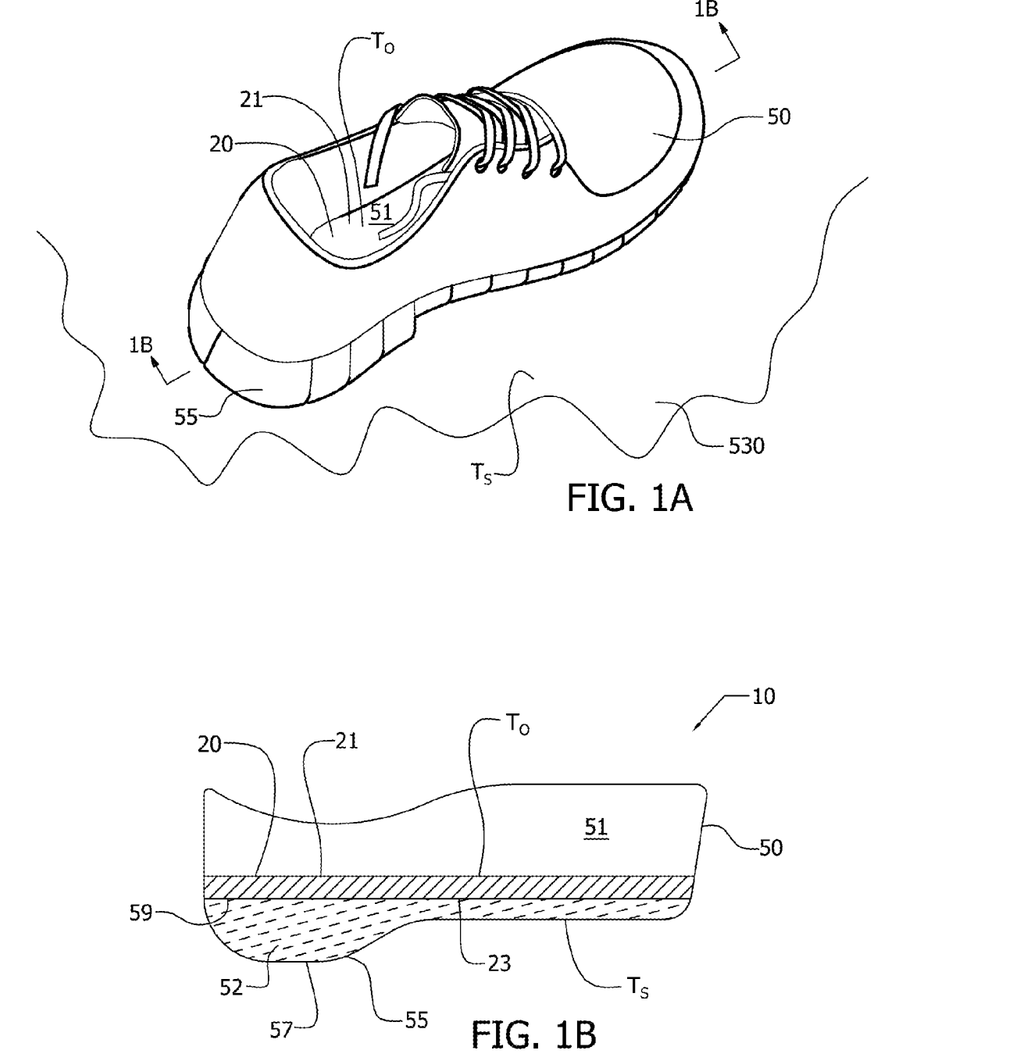
FIG. 1A illustrates by perspective view an exemplary implementation of a thermal protection system.
FIG. 1B illustrates by cut-away side view portions of the exemplary implementation of a thermal protection system of FIG. 1A.

FIG. 1A illustrates an exemplary implementation of a thermal protection system 10 that includes insert 20 received within shoe 50. Insert 20, as illustrated in FIG. 1A, is received within cavity 51 of shoe 50. Shoe 50 includes, for example, athletic footwear (e.g. soccer shoes, football shoes, track shoes, tennis shoes), shoes, boots, sandals, slippers, moccasins, and protective gear for the foot. Cavity 51 is the portion of shoe 50 that receives a foot of a user. Shoe 50 is in contact with surface 530, and surface 530 has surface temperature $T_s$, as illustrated. Surface temperature $T_s$ may be uncomfortable or injurious to the foot. For example, surface 530 may be heated to surface temperature $T_s$ by the sun or by proximity to a heat source such as fire or heated material. Surface 530 may be an athletic field, for example, a football field, soccer field, rugby pitch, or lacrosse field, and shoe 50 may be correspondingly adapted for use on surface 530 (i.e., a soccer shoe, football shoe, etc.)

Insert 20, in some implementations, may be removably receivable within cavity 51 of shoe 50 to allow the user to place insert 20 within cavity 51 or to remove insert 20 from cavity 51. As illustrated in FIG. 1B, absent insert 20, side 59 of sole 55 defines a portion of cavity 51. Side 23 of insert 20 is biased against side 59 of sole 55 of shoe 50 when insert 20 is received operatively within cavity 51, as illustrated. When the foot of the user is received by shoe 50, portions of the foot are biased against side 21 of insert 20, in this implementation. In other implementations, insert 20 may be formed into shoe 50, for example by being bonded to the sole 55, so that insert 20 is non-removable.

When side 57 of sole 55 is biased against surface 530, surface temperature $T_s$ may cause the transfer of heat between surface 530 and side 21 of insert 20 through sole 55 and through insert 20. In this implementation, insert 20 forms an insulating barrier to side 21 of insert 20 that may contact the foot of the user within cavity 51 of shoe 50. The insulating properties of insert 20 controls temperature $T_o$ of side 21 of insert 20 against surface temperature $T_s$ of surface 530. Temperature $T_o$ may be controlled by the insulating properties of insert 20 to a temperature that is comfortable to the foot of the user, or a temperature that is non-injurious to the foot of the user, in various implementations.

Figure 2A:
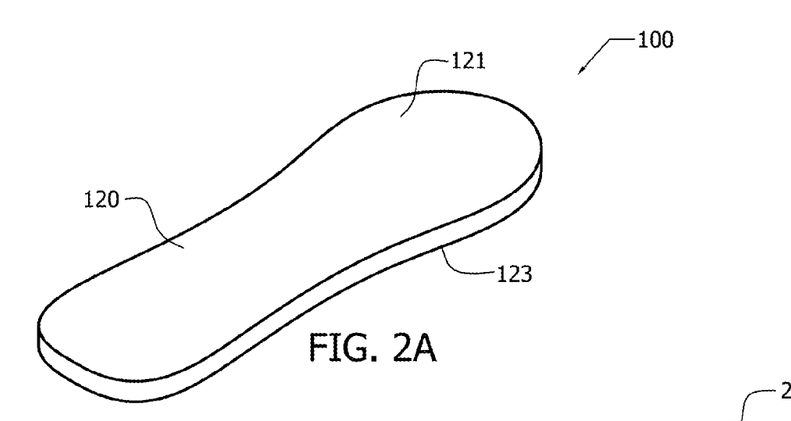
FIG. 2A illustrates by perspective view an exemplary implementation of a thermal protection system.

FIG. 2A illustrates a portion of exemplary implementation of a thermal protection system 100 including insert 120. Insert 120, as illustrated in FIG. 2A, is shaped in conformity with the plantar surface of the foot of the user. When insert 120 is received within a cavity of a shoe, such as cavity 51 of shoe 50, side 121 of insert 120 is oriented to be biased against the foot of the user, and side 123 of insert 120 is biased against the entirety of a side of a sole within the cavity, such as the portion of side 59 of sole 55 bounding cavity 51, in this implementation. Side 121 may be biased against generally the entire plantar surface of the foot when the foot is received within the cavity of the shoe.

Figure 2B:
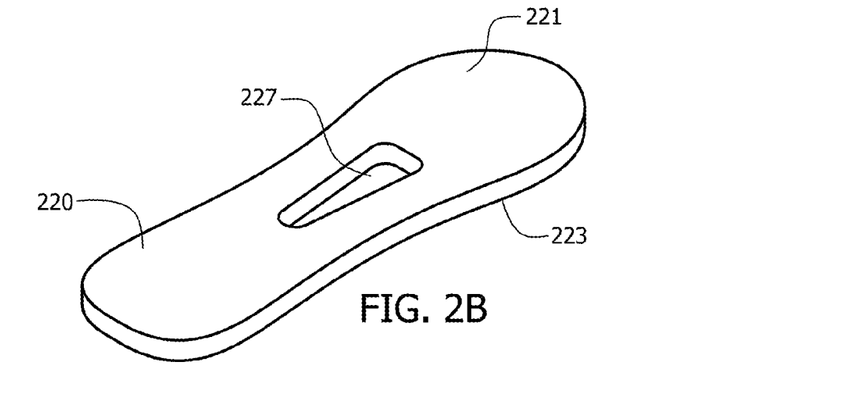
FIG. 2B illustrates by perspective view an exemplary implementation of a thermal protection system.

FIG. 2B illustrates a portion of exemplary implementation of a thermal protection system 200 including insert 220. Insert 220, in this exemplary implementation, includes gap 227 that passes through insert 220 between sides 221, 223. When insert 220 is received within a cavity of a shoe, such as cavity 51 of shoe 50, side 221 of insert 220 is oriented to be biased against only a portion of the plantar surface of the foot when the foot is received within the cavity, in this implementation. Side 223 of insert 220 may be biased against only a portion of a side of a sole within the cavity, such as side 59 of sole 55. For example, gap 227 may correspond to portions of the plantar surface proximate the arch so that side 221 is biased against portions of the foot proximate the heel and proximate ball of the foot including the toes while not contacting portions of the plantar surface proximate the arch. Inclusion of gap 227 may allow insert 220 to consume less volume within the cavity, which may make insert 220 more unobtrusive to the user. Inclusion of the gap 227 may facilitate insertion of insert 220 into the cavity or removal of insert 220 from cavity.

Figure 3:
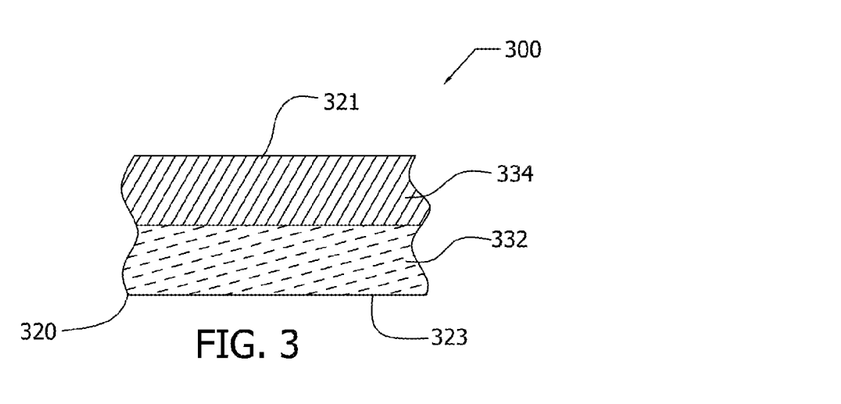
FIG. 3 illustrates by cut-away view portions of an exemplary implementation of a thermal protection system.

FIG. 3 illustrates a portion of exemplary implementation of a thermal protection system 300 including portions of insert 320. As illustrated in FIG. 3, insert 320 includes layer 332 and layer 334 in biased fixed engagement with one another to form a unitary structure. Layer 334 forms side 321 of insert 320, and layer 332 forms side 323 of insert 320, as illustrated. When insert 320 is inserted into a cavity of a shoe, such as cavity 51 of shoe 50, side 321 is oriented such that side 321 may be biased against the foot of the user, while side 323 may be in biased engagement with the sole of the shoe, such as sole 55 of shoe 50.

Layers 332, 334 may comprise differing materials that confer differing mechanical or thermal properties upon insert 320. For example, layer 332 may include an aerogel formed of glass or $SiO_2$. Aerogel, in various implementations, is a synthetic material made by extraction of a liquid component of a gel by supercritical drying leaving the uncollapsed solid matrix that forms the aerogel. Aerogels may be formed from silica gels. Aerogels have been formed, for example, from alumina, chromia, tin dioxide, or carbon. Aerogel is a thermal insulator because a non-conductive material forms the solid matrix while the solid matrix blocks convection of the gas phase, and the solid matrix may produce the Knudsen effect that reduces thermal conduction through the gas phase.

Layer 334, for example, may include a meta aramid polymer formed from the monomers m-phenylenediamine and isophthaloyl chloride. The meta aramid polymer may be heat resistant and insulating, and may exhibit wear properties to withstand engagement with the foot of the user. The meta aramid polymer may be, for example, Nomex® manufactured by E. I. du Pont de Nemours and Company of Wilmington, Del.

In other implementations, layers 332, 334 may comprise substantially the same material, and insert 320 may be so formed for manufacturing reasons or to confer thermal or mechanical properties upon insert 320.

Figure 4A:
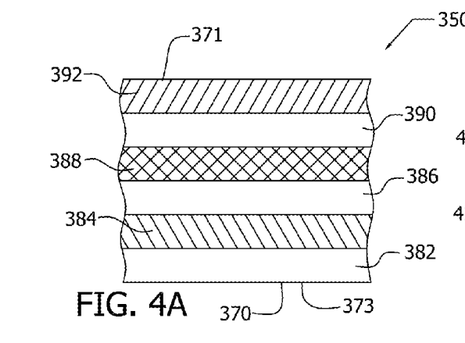
FIG. 4A illustrates by cut-away view portions of an exemplary implementation of a thermal protection system.

FIG. 4A illustrates a portion of exemplary implementation of a thermal protection system 350 including portions of insert 370. As illustrated in FIG. 4A, insert 370 includes layers 382, 384, 386, 388, 390, 392 bonded to one another in succession. Layers 382, 384, 386, 388, 390, 392, in this exemplary implementation, comprise materials as listed in Table 1.

TABLE 1

Materials of layers 382, 384, 386, 388, 390, 392 of insert 370

| Layer | Material | Thickness (mm) |
|---|---|---|
| 392 | pfg pet dermatherapy | 0.2 |
| 390 | PE 2A 2.0 mm | 1.85 |
| 388 | Meta aramid polymer 100% 340 g/m² | 0.25 |
| 386 | TFP50131A 100% glass | 0.40 |
| 384 | TFP50131A 100% glass | 0.40 |
| 382 | Meta aramid polymer/Polyimide-amide 80/20 67 g/m² | 0.15 |

Layer 392 forms side 371 of insert 370, and layer 382 forms side 373 of insert 370, as illustrated in FIG. 4A. When insert 370 is inserted into a cavity of a shoe, such as cavity 51 of shoe 50, side 371, which is formed of the material of layer 392, is oriented to be biased against the foot of the user, while side 373, which is formed of the material of layer 382, is in biased engagement with the sole of the shoe, such as sole 55 of shoe 50, in this implementation. In this implementation, layer 392 is a polyester fabric containing anti microbial material to reduce germ and mold growth made by Precision Fabrics of Greensboro N.C.

Figure 4B:
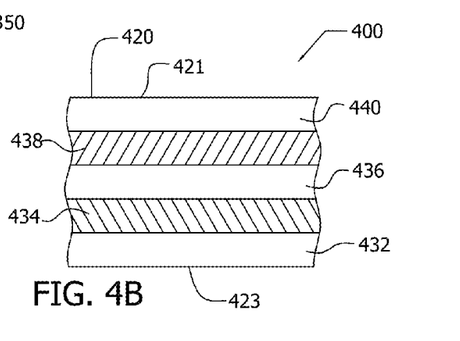
FIG. 4B illustrates by cut-away view portions of an exemplary implementation of a thermal protection system.

FIG. 4B illustrates a portion of exemplary implementation of a thermal protection system 400 including portions of insert 420. As illustrated in FIG. 4B, insert 420 includes layers 432, 434, 436, 438, 440 bonded to one another in succession. Layer 440 forms side 421 of insert 420, and layer 432 forms side 423 of insert 420, as illustrated in FIG. 4B. When insert 420 is inserted into a cavity of a shoe, such as cavity 51 of shoe 50, side 421, which is formed of the material of layer 440, is oriented to be biased against the foot of the user, while side 423, which is formed of the material of layer 432, is in biased engagement with the sole of the shoe, such as sole 55 of shoe 50, in this implementation. Layers 432, 434, 436, 438, 440, in this exemplary implementation, comprise materials as listed in Table 2.

TABLE 2

Materials of layers 432, 434, 436, 438, 440 of insert 420

| Layer | Material | Thickness (mm) |
|---|---|---|
| 440 | pfg pet dermatherapy | 0.2 |
| 438 | PE 2A 2.0 mm | 1.85 |
| 436 | Meta aramid polymer 100% 340 g/m² | 0.25 |
| 434 | TFP50131A 100% glass | 0.40 |
| 432 | Meta aramid polymer/Polyimide-amide 80/20 67 g/m² | 0.15 |

Figure 4C:
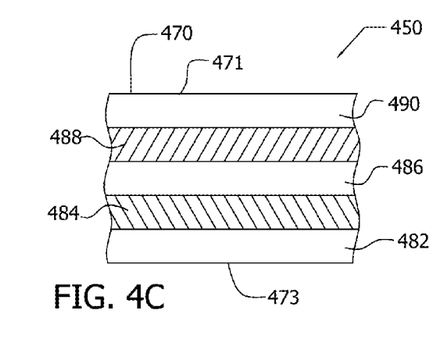
FIG. 4C illustrates by cut-away view portions of an exemplary implementation of a thermal protection system.

FIG. 4C illustrates a portion of exemplary implementation of a thermal protection system 450 including portions of insert 470. As illustrated in FIG. 4C, insert 470 includes layers 482, 484, 486, 488, 490 bonded to one another in succession. Layer 490 forms side 471 of insert 470, and layer 482 forms side 473 of insert 470, as illustrated in FIG. 4C. When insert 470 is inserted into a cavity of a shoe, such as cavity 51 of shoe 50, side 471, which is formed of the material of layer 490, is oriented to be biased against the foot of the user, while side 473, which is formed of the material of layer 482, is in biased engagement with the sole of the shoe, such as sole 55 of shoe 50, in this implementation. Layers 482, 484, 486, 488, 490 comprise materials as listed in Table 3, in this exemplary implementation.

TABLE 3

Materials of layers 482, 484, 486, 488, 490 of insert 470

| Layer | Material | Thickness (mm) |
|---|---|---|
| 490 | pfg pet dermatherapy | 0.2 |
| 488 | PE/EVA 3TS 1.5 mm | 1.5 |
| 486 | Meta aramid polymer 100% 340 g/m² | 0.25 |
| 484 | LF1530 3.5 mm 53/47 glass/Al₂O₃ | 1.35 |
| 482 | Meta aramid polymer/Polyimide-amide 80/20 67 g/m² | 0.15 |

Figure 4D:
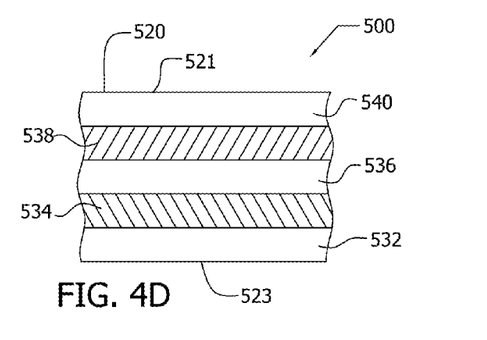
FIG. 4D illustrates by cut-away view portions of an exemplary implementation of a thermal protection system.

FIG. 4D illustrates a portion of exemplary implementation of a thermal protection system 500 including portions of insert 520. As illustrated in FIG. 4D, insert 520 includes layers 532, 534, 536, 538, 540 bonded to one another in succession. Layer 540 forms side 521 of insert 520, and layer 532 forms side 523 of insert 520, as illustrated in FIG. 4D. When insert 520 is inserted into a cavity of a shoe, such as cavity 51 of shoe 50, side 521, which is formed of the material of layer 540, is oriented to be biased against the foot of the user, while side 523, which is formed of the material of layer 532, is in biased engagement with the sole of the shoe, such as sole 55 of shoe 50, in this implementation. Layers 532, 534, 536, 538, 540 comprise materials as listed in Table 4, in this exemplary implementation.

TABLE 4

Materials of layers 532, 534, 536, 538, 540 of insert 520

| Layer | Material | Thickness (mm) |
|---|---|---|
| 540 | pfg pet dermatherapy | 0.2 |
| 538 | PE 2A 2 lb 2.0 mm | 1.85 |
| 536 | Meta aramid polymer 100% 340 g/m² | 0.25 |
| 534 | Pacor 1900 100% glass | 1.8 |
| 532 | Meta aramid polymer/Polyimide-amide 80/20 67 g/m² | 0.15 |

Figure 4E:
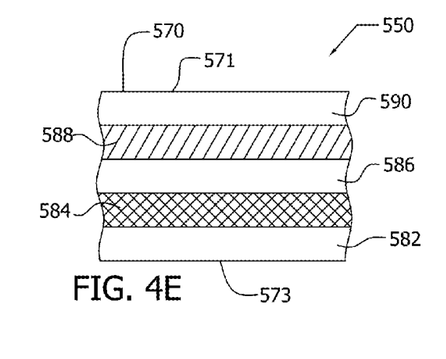
FIG. 4E illustrates by cut-away view portions of an exemplary implementation of a thermal protection system.

FIG. 4E illustrates a portion of exemplary implementation of a thermal protection system 550 including portions of insert 570. As illustrated in FIG. 4E, insert 570 includes layers 582, 584, 586, 588, 590 bonded to one another in succession. Layer 590 forms side 571 of insert 570, and layer 582 forms side 573 of insert 570, as illustrated in FIG. 4E. When insert 570 is inserted into a cavity of a shoe, such as cavity 51 of shoe 50, side 571, which is formed of the material of layer 590, is oriented to be biased against the foot of the user, while side 573, which is formed of the material of layer 582, is in biased engagement with the sole of the shoe, such as sole 55 of shoe 50, in this implementation. Layers 582, 584, 586, 588, 590 comprise materials as listed in Table 5.

TABLE 5

Materials of layers 582, 584, 586, 588, 590 of insert 570

| Layer | Material | Thickness (mm) |
|---|---|---|
| 590 | pfg pet dermatherapy | 0.2 |
| 588 | PE 2A 2 lb 2.0 mm | 1.85 |
| 586 | Meta aramid polymer 100% 340 g/m² | 0.25 |

TABLE 5-continued

Materials of layers 582, 584, 586, 588, 590 of insert 570

| Layer | Material | Thickness (mm) |
|---|---|---|
| 584 | LF1530 3.5 mm 53/47 glass/$Al_2O_3$ | 1.35 |
| 582 | Meta aramid polymer/Polyimide-amide 80/20 67 g/m$^2$ | 0.15 |

Figure 4F:
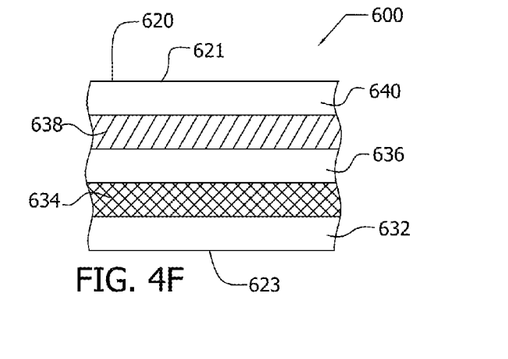
FIG. 4F illustrates by cut-away view portions of an exemplary implementation of a thermal protection system.

FIG. 4F illustrates a portion of exemplary implementation of a thermal protection system 600 including portions of insert 620. As illustrated in FIG. 4F, insert 620 includes layers 632, 634, 636, 638, 640 bonded to one another in succession. Layer 640 forms side 621 of insert 620, and layer 632 forms side 623 of insert 620, as illustrated in FIG. 4F. When insert 620 is inserted into a cavity of a shoe, such as cavity 51 of shoe 50, side 621, which is formed of the material of layer 640, is oriented to be biased against the foot of the user, while side 623, which is formed of the material of layer 632, is in biased engagement with the sole of the shoe, such as sole 55 of shoe 50, in this implementation. Layers 632, 634, 636, 638, 640, in this exemplary implementation, comprise materials as listed in Table 6.

TABLE 6

Materials of layers 632, 634, 636, 638, 640 of insert 620

| Layer | Material | Thickness (mm) |
|---|---|---|
| 640 | pfg pet dermatherapy | 0.2 |
| 638 | PE/EVA 3TS 1.5 mm | 1.5 |
| 636 | Meta aramid polymer 100% 340 g/m$^2$ | 0.25 |
| 634 | aerogel glass/aerogel 5 mm | 4.85 |
| 632 | Meta aramid polymer/Polyimide-amide 80/20 67 g/m$^2$ | 0.15 |

EXPERIMENTAL RESULTS

Experiment 1—In Vitro Testing

Exemplary inserts 370, 420, 470, 520, 570, 620 were tested according to the following Bench Testing Procedure:
a. Cut all materials into 5"×5" squares
b. Pre-heat a digital hot plate (Stable Temp 1110016H-CP by Cole Parmer) to 55° C. (131° F.); the heat plate model is adjustable in 5° C. increments.
c. Prepare the digital recorder/thermocouple with type K probe, (DigiSense 20250-02) prep procedure includes clearing the memory, setting the recording rate, and the duration of the experiment
d. Stack the materials in order as specified for the insert
e. Place the insert with material closest to the human up on a hot plate
f. Place the thermocouple probe on the face material, and place 4 layers of insulation on top of the probe followed by a 0.75" thick block of wood and a vessel containing 0.5 gallons of water. Note: the insulation and the wood were used to stabilize the weight without damaging the probe.
g. Record the data at 15 minute intervals for 2 hours for each composite structure The results of Experiment 1 are presented in Table 7. In Experiment 1, the heat source (the heat plate) was placed against sides 373, 423, 473, 523, 573, 623 of inserts 370, 420, 470, 520, 570, 620, respectively. Table 7 gives the temperature measured at the sides 371, 421, 471, 521, 571, 621 of inserts 370, 420, 470, 520, 570, 620, respectively after 2 hours of exposure to the heat source.

TABLE 7

| Insert | Temperature at 120 minutes ° F. | thickness (mm) |
|---|---|---|
| 370 | 107.1 | 2.90 |
| 420 | 107.8 | 2.05 |
| 470 | 109.7 | 5.15 |
| 520 | 107.2 | 4.25 |
| 570 | 111.5 | 2.85 |
| 620 | 106.7 | 5.85 |

Description of Experimental Procedure for Experiments 2 and 3—In Vivo Tests

Exemplary inserts 370, 420, 470, 520, 570, 620 were tested experimentally. Forty-seven subjects both male and female, ages 18-22 participated in this experimental testing at The Citadel. The subjects were asked to perform three 5-minute submaximal tests (60-65% of heart rate maximum, as measured with Polar™ heart rate monitor) on an elliptical machine. The foot pedals of the elliptical machine were heated to 120° F. via heating pads (two 50 watt water proof Sunbeam heating pads) during all tests. It was noted that the heating pads both heated differently, with the right pad always heating hotter than the left. Specifically, the difference between heating pads at rest and between subjects was (10° F.), 123.2° F. and 113.1° F., respectively.

Inserts 370, 420, 470, 520, 570, 620 were randomly assigned to the subjects, and the insert randomly selected from inserts 370, 420, 470, 520, 570, 620 was placed under the subject's socked feet and on top of the heating pad.

At the end of each of the three 5 minute testing sessions, the temperature of the soles of the feet was monitored and recorded via a thin wired temperature sensor taped to the soles of the participant's feet (type-K thermometer with a thermocouple, Model number: DM6801A+). In addition, heat was measured at the end of each 5-minute exercise bout with a heat radar gun (Raytek Minitemp MT6) directed at the ball of the foot. In addition to measurement of the surface temperature, subjects rated their perception of heat they experienced according to a thermal perception scale that assigns a number (1 to 9) to the perceived thermal stress with 1 being minimal and 9 being unbearably hot (see Table 9). Thermal perception of heat was assessed at minute 4:30 in each of the 5 minute testing sessions.

Experiment 2—In Vivo

Experiment 21 tested exemplary inserts 370, 420, 470, 520, 570, 620. The results of Experiment 2 are presented in FIG. 5. Each subject had an insert selected from inserts 370, 420, 470, 520, 570, 620 biased against the left foot and an insert selected from inserts 370, 420, 470, 520, 570, 620 biased against the right foot. The insert biased against the left foot differed from the insert biased against the right foot. The order of testing in Experiment 2 was as follows:

Session 1 (minutes 0-5): Left foot—insert 520 Right foot—insert 470

Session 2 (minutes 5-10): Left foot—insert 370 Right foot—insert 420

Session 3 (minutes 10-15): Left foot—insert 620 Right foot—insert 570

Figure 5:
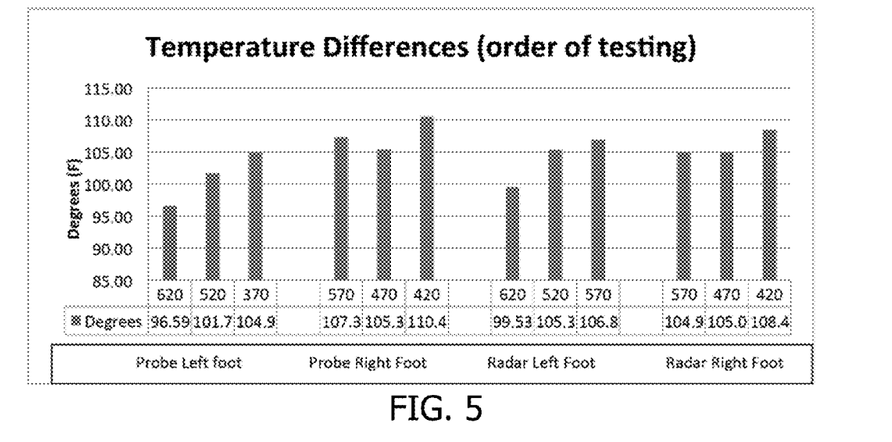
FIG. 5 illustrates by bar chart results from Experiment 2 in vivo testing of exemplary implementations of inserts.

As the subject continued exercise with each foot, both the heating pad generated heat and the subject created heat due to physical exertion. The results of Experiment 2 showed that insert 620 (the thickest of all the inserts) resulted in less temperature gain versus the other inserts when temperature was measured using the probe. Both insert 520 and 620 were cooler than insert 370, while inserts 470 and 570 were significantly cooler than insert 420 on the right foot when temperature was measured using the heat radar gun.

Experiment 3—In Vivo

Figure 6:
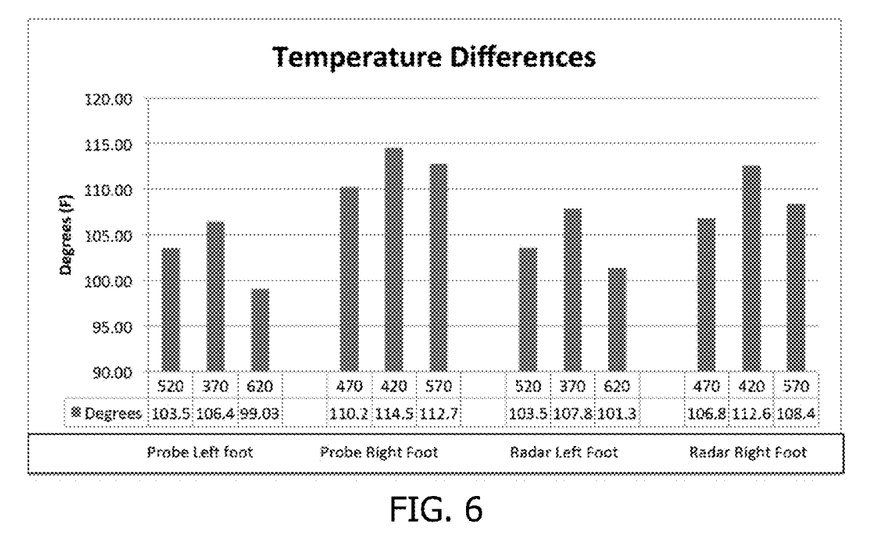
FIG. 6 illustrates by bar chart results from Experiment 3 in vivo testing of exemplary implementations of inserts.

Experiment 3 tested inserts 370, 420, 470, 520, 570, 620. The results of Experiment 3 are presented in FIG. 6. Each subject had an insert selected from inserts 370, 420, 470, 520, 570, 620 biased against the left foot and an insert selected from inserts 370, 420, 470, 520, 570, 620 biased against the right foot. The insert biased against the left foot differed from the insert biased against the right foot. The order of testing in Experiment 3 was as follows:

Session 1 (minutes 0-5): Left foot—insert 620 Right foot—insert 570
Session 2 (minutes 5-10): Left foot—insert 420 Right foot—insert 470
Session 3 (minutes 10-15): Left foot—insert 370 Right foot—insert 420

The results of Experiment 3 showed that insert 620 (the thickest of all the inserts), insert 520 and insert 470 resulted in less temperature gain versus the other inserts when temperature was measured with the probe. Both inserts 520 and 620 were cooler than insert 370 when temperature was measured with the heat radar gun.

Figure 7:
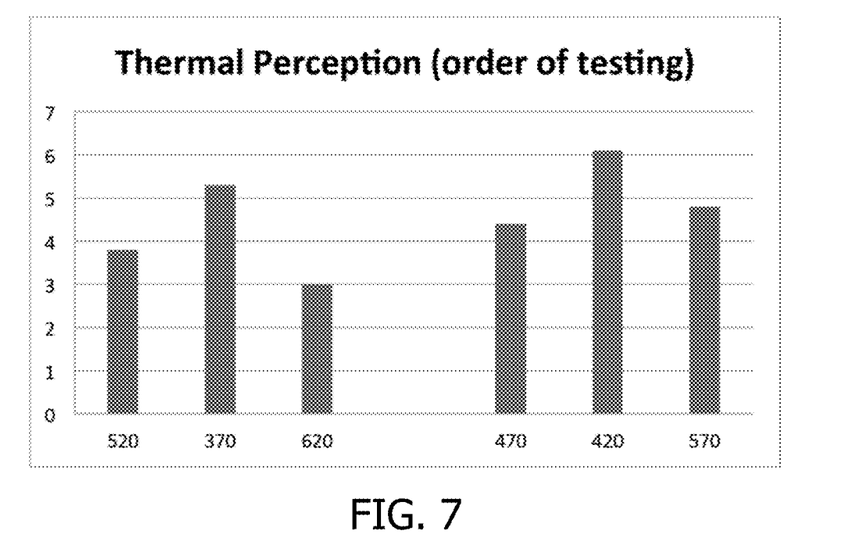
FIG. 7 illustrates by bar chart results from Experiments 2 & 3 in vivo testing of exemplary implementations of inserts; and, FIG. 8 illustrates by bar chart results from Experiments 2 & 3 in vivo testing of exemplary implementations of inserts.

FIG. 7 illustrates the ratings of perceived heat (scale of 1 to 9) as experienced by the subjects. As indicated by FIG. 7, the subjects experienced less heat discomfort with inserts 520, 620, and 470.

Figure 8:
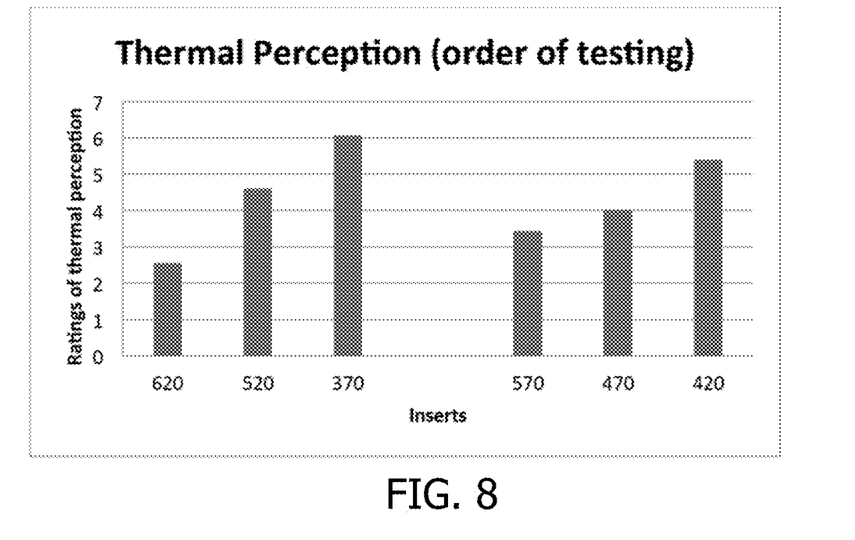

FIG. 8 illustrates the ratings of perceived heat as experienced by the subjects. The higher numbers indicate a greater heat stress as experienced by the subject, while lower numbers indicate less heat stress. The numbers indicate the subjects felt significantly less heat discomfort with inserts 520, 620, 570, and 470. The difference for 570 may have been due to the order of testing (first).

Summary

In summary, the thickest inserts 620 and 520 performed the best in reducing temperature exposure to the subject. Insert 470 was also thick and tested well but this may be due to the order of testing (second) as well as its thickness. Insert 570 was not thick but tested well with respect to thermal perception. In comparing the results of in vivo Experiments 2 & 3, with the bench testing of Experiment 1, insert 620 (106.7° F.) and insert 520 (107.2° F.) tested well, but not insert 570 (111.5° F.). Although inserts 370, 420 tested well in bench test Experiment 1, inserts 370, 420 did not test well in the in vivo Experiments 2 & 3. This may be due to thinner materials of insert 370 and insert 420 that may be compressed by the subjects' weight resulting in increased heat transfer. The volume of the composite may affect the temperatures recorded. However, as the inserts will be used in footwear, volume of the insert cannot be overlooked as volume may impact the performance of the user. To some degree, the user's body may be acting to cooling the insert by convection of heat away from the insert through the user's circulatory system.

Exemplary materials used in the various implementations are listed in Table 8. The exemplary materials are listed by generic name and material properties may be included. The trade name, commercial source, and function of each of the exemplary materials are also listed in Table 8.

TABLE 8

| Material | Exemplary Trade name | Source | Function |
|---|---|---|---|
| meta aramid polymer | Nomex | E. I. du Pont de Nemours and Company of Wilmington, DE | insulation + wear resistance |
| polyimide-amide, 70 gsm, calendered | Kermel | E. I. du Pont de Nemours and Company of Wilmington, DE | insulation + cushioning |
| meta aramid polymer in combination with polyimide-amide | Nomex/Kermel 80%/20% | E. I. du Pont de Nemours and Company of Wilmington, DE | insulation + cushioning |
| Polyethylene foam, 2 lb/ft³ density, 2 mm thickness, closed cell | * | Pacor, Inc. of Bordentown, NJ 08505 | insulation + cushioning |
| Glass fiber wet-layed paper, 80 gsm nano-glass | * | Pacor, Inc. of Bordentown, NJ 08505 | insulation + cushioning |
| Glass fiber needle punch, 1900 gsm, 1.5 mm compressed | * | Pacor, Inc. of Bordentown, NJ 08505 | insulation + cushioning |
| Glass fiber water-layed, 1530 gsm, 1.35 mm compressed | * | Pacor, Inc. of Bordentown, NJ 08505 | insulation + cushioning |
| Glass fiber + aerogel silica coating 5.0 mm material | Aerogel | Pacor, Inc. of Bordentown, NJ 08505 | insulation + cushioning |
| Polyester fabric, treated for microbial resistance and wicking properties | pfg pet dermatherapy | Precision Fabrics of Greensboro, NC | antibacterial + antifungal + wicking |

The scale used by subjects to rate their perception of thermal stress during the course of various in vivo experiments is indicated in Table 9.

TABLE 9

Rating of Perceived Thermal Stress on scale of 1 to 9

| Scale | Perceptual Rating |
|---|---|
| 1 | comfortable temperature |
| 2 | |
| 3 | starting to become hot |
| 4 | |
| 5 | hot |
| 6 | |
| 7 | very hot |
| 8 | |
| 9 | unbearably hot |

Exemplary materials and combinations of materials that may be used in various other implementations are listed as follows:
PP Scrim SCRIM polypropylene 15 gsm with thickness of 0.35 mm
spool 15 gsm (Trade name: SupaCool) glass paper 15 gsm thickness 0.1 mm
SupaCool 10 gsm glass (Scotchlite, glass bead and cotton scrim, beads facing Supacool 95% cotton, 5% spandex
SupaCool 15 gsm glass PET scrim 20 gsm
Carbon fiber+Ni+Cooper coat 34 gsm PET scrim 20 gms
2 mm Edura Cool (its Trade Name) 100% PET micro denier, cotton jersey 95% cotton, 5% spandex
2 mm Edura Cool, 100% PET micro denier
Some limited testing of these listed materials has been conducted.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. An insert comprising:
a first layer and a second layer bonded to one another, the insert removably receivable within a cavity of a shoe to form a thermally insulating barrier between a plantar surface of a user's foot and a sole of the shoe with a side of the first layer oriented toward the sole and a side of the second layer oriented toward the plantar surface, the first layer comprising an aerogel and the second layer comprising a meta-aramid polymer, and further comprising a gap formed in correspondence with portions of the plantar surface generally proximate an arch portion.

2. The insert of claim 1, the insert comprising one or more layers in addition to the first layer and the second layer, the one or more layers in combination with the first layer and the second layer in bonded engagement with one another.

3. The insert of claim 2, the one or more layers ranging from one to four in number.

4. The insert of claim 1, wherein the insert is received within the cavity of the shoe.

5. An insert, comprising:
a plurality of layers bonded to one another and removably receivable within a cavity of a shoe to create a thermal barrier between a sole of the shoe and a plantar surface of a foot of a user, wherein the plurality of layers comprises:
a first layer comprising a meta-aramid polymer,
a second layer comprising an aerogel, and
a third layer comprising a meta-aramid polymer, wherein the second layer is between the first layer and the third layer.

6. The insert of claim 5, wherein the plurality of layers in sequence comprises a layer comprising polyester fabric, a layer comprising closed cell polyethylene foam, 2 lb/ft$^3$ density, a layer comprising meta-aramid polymer 100% 340 g/m$^2$, a layer comprising glass fiber wet-laid paper, 80 g/m$^2$, a layer comprising glass fiber wet-laid paper, 80 g/m$^2$, and a layer comprising meta-aramid polymer/polyimide-amide 80%/20% 67 g/m$^2$, the plurality of layers oriented to bias the layer comprising polyester fabric against the plantar surface and to bias the layer comprising meta-aramid polymer/polyimide-amide 80%/20% 67 g/m$^2$ against the sole.

7. The insert of claim 5, wherein the plurality of layers in sequence comprises a layer comprising polyester fabric, a layer comprising closed cell polyethylene foam, 2 lb/ft$^3$ density, a layer comprising meta-aramid polymer 100% 340 g/m$^2$, a layer comprising glass fiber wet-laid paper, 80 g/m$^2$, and a layer comprising meta-aramid polymer/polyimide-amide 80%/20% 67 g/m$^2$, the plurality of layers oriented to bias the layer comprising polyester fabric against the plantar surface and to bias the layer comprising meta-aramid polymer/polyimide-amide 80%/20% 67 g/m$^2$ against the sole.

8. The insert of claim 5, wherein the plurality of layers in sequence comprises a layer comprising polyester fabric, a layer comprising polyester/ethyl vinyl acetate foam, a layer comprising meta-aramid polymer 100% 340 g/m$^2$, a layer comprising 53%/47% glass fiber/Al$_2$O$_3$ water-laid aerogel, 1530 g/m$^2$, and a layer comprising meta-aramid polymer/polyimide-amide 80%/20% 67 g/m$^2$, the plurality of layers oriented to bias the layer comprising polyester fabric against the plantar surface and to bias the layer comprising meta-aramid polymer/polyimide-amide 80%/20% 67 g/m$^2$ against the sole.

9. The insert of claim 5, wherein the plurality of layers in sequence comprises a layer comprising polyester fabric, a layer comprising closed cell polyethylene foam, 2 lb/ft$^3$ density, a layer comprising meta-aramid polymer 100% 340 g/m$^2$, a layer comprising needle-punched glass fiber 1900 g/m$^2$ aerogel, and a layer comprising meta-aramid polymer/polyimide-amide 80%/20% 67 g/m$^2$, the plurality of layers oriented to bias the layer comprising polyester fabric against the plantar surface and to bias the layer comprising meta-aramid polymer/polyimide-amide 80%/20% 67 g/m$^2$ against the sole.

10. The insert of claim 5, wherein the plurality of layers in sequence comprises a layer comprising polyester fabric, a layer comprising closed cell polyethylene foam, 2 lb/ft$^3$ density, a layer comprising meta-aramid polymer 100% 340 g/m$^2$, a layer comprising 53%/47% glass fiber/Al$_2$O$_3$ water-laid aerogel, 1530 g/m$^2$, and a layer comprising meta-aramid polymer/polyimide-amide 80%/20% 67 g/m$^2$, the plurality of layers oriented to bias the layer comprising polyester fabric against the plantar surface and to bias the layer comprising meta-aramid polymer/polyimide-amide 80%/20% 67 g/m$^2$ against the sole.

11. The insert of claim 5, wherein the plurality of layers in sequence comprises a layer comprising polyester fabric, a layer comprising polyester/ethyl vinyl acetate foam, a layer comprising meta-aramid polymer 100% 340 g/m², a layer comprising glass fiber aerogel with a silica aerogel coating, and a layer comprising meta-aramid polymer/polyimide-amide 80%/20% 67 g/m², the plurality of layers oriented to bias the layer comprising polyester fabric against the plantar surface and to bias the layer comprising meta-aramid polymer/polyimide-amide 80%/20% 67 g/m² against the sole.

12. The insert of claim 5, further comprising a fourth layer comprising aerogel and between the first layer and the third layer.

13. The insert of claim 12, wherein the second and fourth layers each comprise a same sub stance.

14. The insert of claim 13, wherein the same substance is glass fiber wet-laid paper, 80 g/m².

15. The insert of claim 5, wherein the aerogel comprises glass and aluminum oxide.

16. The insert of claim 15, wherein the aerogel consists essentially of a combination of glass and aluminum oxide in a proportion of approximately 53/47, respectively.

17. The insert of claim 5, wherein the first layer consists essentially of meta-aramid polymer and the third layer comprises polymer/polyimide-amide.

18. The insert of claim 17, wherein the layers are oriented to bias the first layer against the plantar surface of the foot of the user and the third layer against the sole of the shoe.

19. The insert of claim 5, wherein the aerogel comprises a needle-punched glass fiber.

20. The insert of claim 5, wherein the aerogel comprises a wet-laid glass fiber.

* * * * *